ized compound of United States Patent Office 2,959,624
Patented Nov. 8, 1960

2,959,624

PROCESS FOR PREPARING 1,1,1-TRIFLUORO-2-CHLORO-2-BROMETHANE FROM 1,1,2-TRIFLUORO-1-BROMO-2-CHLORETHANE

Otto Scherer and Heinrich Kuhn, Frankfurt am Main, Germany, assignors to Farbwerke Hoechst Aktiengesellschaft vormals Meister Lucius & Bruning, Frankfurt am Main-Hoechst, Germany, a company of Germany No Drawing. Filed July 15, 1958, Ser. No. 748,588

Claims pirority, application Germany July 18, 1957

2 Claims. (Cl. 260—653)

1,1,1-trifluoro-2-chloro-2-bromethane known as inhalation anaesthetic can be prepared by bromination of 1,1,1-trifluoro-2-chlorethane or by chlorination of 1,1,1-trifluoro-2-bromethane. For both reactions temperatures amounting to 400–500° C. are necessary (cf. British patent specification 767,779).

Since in view of the high temperatures and the aggressive halogens applied, special apparatuses are needed for these reactions, it is difficult to carry them out on an industrial scale.

Now we have found that 1,1,1-trifluoro-2-chloro-2-bromethane can easily be obtained in good yield by reacting at the boiling temperature 1,1,2-trifluoro-1-bromo-2-chlorethane successively with a small portion of anhydrous aluminum chloride and isolating the product of the invention.

The reaction is rapidly performed with evolution of heat already at 50° C. (boiling temperature). The necessary amount of aluminum halide may vary between 0.1–25 mol-percents.

The intramolecular rearrangement of perhalogenated compounds by means of $AlCl_3$ is known from J. Am. Chem. Soc. 72, pages 705–707 (1950). In contradistinction thereto trifluorochlorobromethane ($CF_2Br—CFClH$) contains a hydrogen atom. From compounds of similar constitution, for instance pentachlorethane $$(CCl_3—CHCl_2)$$

it is known that in the presence of $AlCl_3$ they easily split off HCl in order to form the corresponding ethylenes. Such a reaction was described by M. A. Mouneyrat, Bulletin de la Société Chimque de France, Paris, third series, volume 19, page 182.

Hydrogen chloride is also split off, even under moderate conditions, from ethanes containing fluorines, e.g., 1,1-difluoro-1,2,2-trichloroethane, by reaction with aluminum chloride. The high mobility of the chlorine atom at the CF group likewise renders possible the reaction with phenolates already at the boiling temperature of the acetone in order to form ethers according to the following equation:

$$C_6H_5.ONa + CF_2Cl—CHCl_2 \rightarrow C_6H_5OCF_2—CHC_2 + NaCl$$

(McBee, Bolt, Industrial and Engineering Chemistry, volume 39, pages 412–415, 1947).

Since it is known that organically linked bromine can much more easily be exchanged than chlorine it had to be expected also in the case of the present invention that HBr would split off under the action of $AlCl_3$. It could never be expected that the isomerization would take a smooth course and that a nearly quantitative yield would be obtained, all the more since by the process of the publication only 50% of the isomerized compound are formed and 40% of difluorotetrachlorethane are formed as a side product due to the exchange taking place between fluorine and chlorine.

The following example serves to illustrate the invention but it is not intended to limit it thereto, the parts being by weight.

Example

A small amount of 1,1,2 - trifluoro-1-bromo-2-chlorethane (boiling point +52° C. under a pressure of 754 mm. Hg) is added to 50 parts of anhydrous aluminum chloride and the reaction mixture is moderately heated. As soon as the reaction takes place, whereby the substance comes to boil, it is maintained by continuously adding 1,1,2-trifluoro-1-bromo-2-chlorethane. In total, 500 parts are added. After washing and drying there are obtained 450–460 parts of 1,1,1-trifluoro-2-chloro-2-bromethane boiling at 50.1° C. under a pressure of 754 mm. Hg=90% of the theoretrical yield.

We claim:

1. Process for preparing 1,1,1-trifluoro-2-chloro-2-bromoethane which comprises heating 1,1,2 - trifluoro - 1-bromo-2-chloroethane with 0.1 to 25 mol percent of anhydrous aluminum chloride to the boiling temperature of the starting material.

2. Process as defined in claim 1 wherein the relative proportions by weight of 1,1,2-trifluoro-1-bromo-2-chloroethane and anhydrous aluminum chloride are about 10:1.

References Cited in the file of this patent

UNITED STATES PATENTS 2,598,411     Miller et al. _____ May 27, 1952

OTHER REFERENCES

Miller et al.: Jour. Amer. Chem. Soc., 72, 705–707, February 1950.